United States Patent [19]

Dexter et al.

[11] Patent Number: 4,902,734

[45] Date of Patent: Feb. 20, 1990

[54] ACID-CURABLE THERMOSET ENAMELS CONTAINING A TRIAZOLE

[75] Inventors: Martin Dexter, Briarcliff Manor, N.Y.; Rudolf A. Behrens, New Fairfield, Conn.

[73] Assignee: Ciba-Geigy Corporation, Ardsley, N.Y.

[21] Appl. No.: 82,894

[22] Filed: Aug. 10, 1987

Related U.S. Application Data

[63] Continuation-in-part of Ser. No. 803,683, Dec. 2, 1985, abandoned.

[51] Int. Cl.$^4$ ............................ C08K 5/34; C08K 5/42
[52] U.S. Cl. ...................................... 524/91; 524/158; 106/287.21; 106/287.23
[58] Field of Search ................................ 529/91, 158; 106/287.21, 287.23

[56] References Cited

U.S. PATENT DOCUMENTS

| | | | |
|---|---|---|---|
| 4,283,327 | 8/1981 | Dexter et al. | 524/91 |
| 4,315,848 | 2/1982 | Dexter et al. | 524/100 |
| 4,426,471 | 1/1984 | Berner | 524/91 |

FOREIGN PATENT DOCUMENTS 2071543  6/1977  Japan.

OTHER PUBLICATIONS

I. R. A. Christie et al., Trans. Inst. Metal Finishes, 50, 19 (1972).

*Primary Examiner*—John Kight
*Assistant Examiner*—Kriellion Morgan
*Attorney, Agent, or Firm*—Luther A. R. Hall

[57] ABSTRACT

Acid-curable thermoset enamel compositions coming in contact with copper or copper-containing alloys are discolored and degrade more rapidly due to leaching of copper into the compositions. The presence of small amounts of benzotriazole or tolutriazole effectively prevents the discoloration and concomitantly retards degradation.

4 Claims, No Drawings

ACID-CURABLE THERMOSET ENAMELS CONTAINING A TRIAZOLE

FIELD OF THE INVENTION

This invention relates to acid-curable thermosetting resin enamels and more particularly to the stabilization of such enamels that come into contact with copper or sources of copper ions during manufacture or end-use application.

BACKGROUND OF THE INVENTION

The use of benzotriazole and tolutriazole as corrosion inhibitors for copper and its alloys is well known. It has been used to prevent the corrosion of copper parts during manufacture and storage.

Benzotriazole has also been used to extend the useful life of polyurethane and thermoplastic acrylic lacquers when applied to a copper substrate. These lacquers when applied to a copper substrate. These lacquers provide good protection for 3–5 years of outdoor exposure. Yellowing and other signs of degradation are noted only after a prolonged period. I. R. A. Christie et al, Trans. Inst. Metal Finishes, 50, 19(1972).

Lacquers based on thermoplastic acrylic resins and polyurethane lacquers are not affected adversely when prepared using manufacturing equipment that contains copper or its alloys. They do not become contaminated with copper or its alloys. They do not become contaminated with copper during application when exposed to pipes, spray nozzles, etc. that are fabricated from metals containing copper. 2-Hydroxyphenylbenzotriazole ultraviolet stabilizers do not develop color when used in these lacquers. As Christie points out, such lacquers will be degraded more rapidly if they are applied over a copper or brass substrate. Environmental weathering of the metal will cause corrosion. The copper compounds produced by corrosion are soluble in the lacquer and will increase the rate of degradation upon weathering and stain the coating.

In contrast to the behavior of thermoplastic acrylic lacquers and polyurethane lacquers, thermosetting acrylic enamels and other paints that are cured using acid catalysts will aggressively attack copper and copper containing alloys such as brass and become contaminated with ionic copper. Such contamination can occur during paint manufacture and during application by contacting copper containing pipes, mixing equipment, spray nozzles, etc. Such contaminated enamels are discolored from the start and suffer from a decrease in stability upon exposure to light. These paints tend to lose gloss and crack sooner than such paints that have not been exposed to sources of copper. The addition of 2-hydroxyphenylbenzotriazoles or 2-hydroxybenzophenones to copper contaminated paints will result in immediate discoloration. It has been found that the use of benzotriazole or tolutriazole will decrease the extent of such copper contamination and improve both the color and durability of acid cured thermoset enamels.

Acid curable thermoset enamels are rapidly displacing thermoplastic lacquers. One of the major reasons for this change is technology stems from environmental considerations. Thermoplastic acrylic lacquers require a greater use of organic solvents to obtain a sprayable viscosity than acid curable enamels. On drying the solvents emitted from thermoplastic paints contribute more to air pollution. Additionally, thermoset automobile enamels have greater solvent resistance and thus resist degradation by inadvertent contact with gasoline and motor oil.

THE INVENTION

The present invention is based on the discovery that the incorporation of 0.001 to 0.5% of benzotriazole or tolutriazole into an acid-curable thermosetting enamel coating composition prevents the discoloration and the decrease in light stability of the coating prepared therefrom by copper or copper ions. The incorporation into the enamel of such amounts of benzotriazole or tolutriazole brings about these highly desired effects.

The instant invention relates to an acid-curable thermosetting enamel coating composition which is stabilized against discoloration, degradation and light sensitivity when coming into contact with a copper or copper alloy substrate which comprises (a) an acid curable thermosetting resin which is selected from the group of thermosetting resins consisting of melamine-acrylic resins, melamine-polyester resins and melamine-alkyd resins;

(b) an acid catalyst for curing such resins which is an aryl sulfonic acid;

(c) an ultraviolet light-absorber which is a 2-(2-hydroxyphenyl)-2H-benzotriazole, and (d) a copper chelating triazole which is benzotriazole or tolutriazole.

DETAILED DESCRIPTION

The thermosetting enamels, according to this invention, used for coating and coloring automobile body parts, are based upon the broad class of acid-curable thermosetting polymers as the carrier matrix into which the various pigments are incorporated. The broad class includes the melamine-acrylic resins, melamine-polyester resins and the melamine-alkyl resins. However, these are often blended, with other resins, plasticizers, and extenders to modify the properties of the polymer to provide a carrier for the pigments in a form suitable for preparing adherent enamels. Acid-curing thermosetting resins for enamels can, of course, also be prepared from thermosetting monomers other than melamine.

Suitable acid-curable resins are all resins in which curing can be accelerated by acid catalysts. These include, in particular, varnishes based on acrylic, polyester, alkyd, melamine, urea and phenolic resins, and especially mixtures of acrylic, polyester or alkyd resins with one another or with a melamine resin. They also include modified varnish gums, for example acrylic-modified polyester or alkyd resins. Examples of specific types of resins described by the term acrylic, polyester and alkyd resins are described in, for example, Wagner, Sarx/Lackkunstharze (Synthetic Varnish Gums) (Munich, 1971), pages 86 to 123 and 229 to 238, or in Ullmann/Encyclopadie der techn. Chemie (Encyclopaedia of Industrial Chemistry), 4th edition, Volume 15 (1978), pages 613 to 628. Acid catalysis is of particular importance for the curing of varnishes containing etherified amino resins, for example methylated or butylated melamine resins (N-methoxymethyl- or N-butoxymethylmelamine or methylated/butylated glycolurils). Such acid cured thermosetting resins, including those listed above are marketed under various commercial labels and are well known in their various forms, modified for specific commercial applications. All these resins have in common the need for the addition thereto of strongly acidic substances to initiate, promote and complete the branching and cross-linking of the underlying polymers to effect proper curing.

The acid catalysts used for curing the above discussed thermosetting polymers, in enamel form, during and after application, are preferably strong organic acids, most preferably strong organic Lewis acids such as the aryl sulfonic acids. The most effective of such acid catalysts for curing the above-mentioned resins is p-toluenesulfonic acid. Benzenesulfonic acid, the various other toluenesulfonic acids as well as the xylene homologs and other commercially touted acids, organic and inorganic for curing and thermosetting resins may be used. However, as pointed out above, all these acids, acidic enough to promote curing of the resins, are all corrosive to metallic copper. Such copper corrosion leads to the undesirable effects discussed above.

The above discussed enamel resins are usually formulated with 0.1 to 5% by weight, preferably 0.5 to 2.5% by weight, of ultra-violet (UV) absorbers. These resins are known to be badly degraded by the UV portion of the spectrum and almost all the commercially available acid curable thermosetting resins are formulated with such UV absorbers. Generally used are the benzophenones, the 2-(2-hydroxyphenyl)-2H-benzotriazoles, the 2-cyanoacrylates and the oxanilides. A preferred type of UV absorbers useful in this invention is the 2-(2-hydroxyphenyl)-2H-benzotriazoles. Commercial UV-absorbers falling into the above mentioned group and widely used include 2-(2-hydroxy-3,5-di-tert-amylphenyl)-2H-benzotriazole (TINUVIN 328), 2-(2-hydroxy-3-tert-butyl-5-methylphenyl)-5-chloro-2H-benzotriazole (TINUVIN 326) and 2-(2-hydroxy-3,5-di-(alpha,alpha-dimethylbenzyl)phenyl-2H- benzotriazole (TINUVIN 900). Other examples of UV-absorbers useful in the instant invention are given on Table 2, pages 622–623, of Kirk-Othmer Encyclopedia of Chemical Technology, Vol. 23, 3rd Ed, John Wiley, 1983. Such materials in the presence of copper ions and full spectrum of light may cause discoloration and degradation of acid-catalyzed thermoset enamel coatings.

Benzotriazole and tolutriazole are useful as component (d) in the context of this invention for prevention of the degradation caused by copper in the enamels. These specific compounds are useful within the concentration range of 0.001 to 0.1% by weight of the thermosetting resin solids in the enamel composition.

From the appended examples it will be seen that the instant liquid, acid-curable enamel compositions or coatings prepared from such compositions including the triazoles have greatly improved resistance to discoloration and degradation resulting from the contact with copper.

By contrast, from the comparative data in the examples, it will be seen that in the absence of the triazoles, the liquid enamels and their resulting coatings discolor and degrade under accelerated aging tests.

EXAMPLE 1

An acid-cured thermosetting acrylic enamel is selected as the test vehicle—PPG DCT 1000 containing 60% solids—30 gm. The enamel is introduced into a glass jar suitable for mixing on a roller mixer. To the enamel is added the listed additives and a copper and zinc metal source consisting of a piece of brass shimstock, 1"×3"×0.001" (2.54 cm×7.62 cm×0.0254 mm) (6 in2, 39 cm2 of brass surface area). The brass is folded to make sure that it is completely exposed to the enamel and properly agitated in the enamel. The benzotriazole and the indicated UV-absorber are added to the enamel and dissolved therein by warming. These formulations are agitated in the jars for 20 hours on a roller mixer with the included brass. The enamels are then analyzed for copper and zinc contents.

The clear thermoset enamels are then sprayed on steel panels that are coated with a white paint (heat set thermoset acrylic resin containing titanium dioxide). The thermoset enamels are cured by baking them at 250° F. (121° C.) for 30 minutes. The thickness of the clear film is 1.5 mil (0.037 mm). Yellowness Index values (YI) of the cured coatings are measured.

|  | %[a] | YI[b] | Cu/ppm | Zn/ppm |
|---|---|---|---|---|
| Coating Alone | — | 0.8 | 28 | 8.4 |
| UVA 1[c] | 2.0 | +0.6 | 23 | 5.6 |
| UVA 1 plus BTA[d] | 2.0 0.2 | 0.0 | Nil | 0.81 |
| UVA 1 plus BTA | 2.0 0.1 | +0.2 | Nil | 1.1 |
| UVA 1 plus BTA | 2.0 0.05 | −0.6 | 1.7 | 1.6 |
| UVA 1 plus TTA[e] | 2.0 0.2 | −0.1 | Nil | 1.3 |
| UVA 1 plus TTA | 2.0 0.1 | −0.3 | 1.2 | 1.7 |
| UVA 1 plus TTA | 2.0 0.05 | −0.3 | 2.9 | 2.2 |

[a]The concentration of the additives are based on the resin content of the paint formulation.
[b]A Yellowness Index of +0.6 is not acceptable. The lower the Yellowness Index, the lower the color.
[c]UVA 1 is 2-[2-hydroxy-3,5-di-(alpha, alpha-dimethylbenzyl)-phenyl]-2H—benzotriazole.
[d]BTA is benzotriazole.
[e]TTA is tolutriazole.

Similar improvements in color can be obtained by substituting the following ultraviolet absorbers for UVA 1, namely 2-(2-hydroxy-3,5-di-tert-amylphenyl)-2H-benzotriazole, or 2-(2-hydroxy-5-tert-octylphenyl)-2H-benzotriazole.

EXAMPLE 2

Approximately 10 cm2 of copper foil is stirred for 96 hours in a clear, acid curable thermoset acrylic enamel. The paint solution is then sprayed on a white base coat cured at 120° C. for 30 minutes and exposed in a QUV light exposure device (Quick Ultraviolet). 20° gloss and cracking after given time exposures are measured. The results of these evaluations are shown in the table. From these evaluations, it can be seen that the addition of minor amounts of benzotriazole results in a marked improvement in both the 20° gloss and resistance to cracking.

| Additive[a] | % | 20° Gloss After Hours in the QUV | | | | | Hours to Crack | Copper ppm |
|---|---|---|---|---|---|---|---|---|
|  |  | 0 | 1200 | 2,000 | 2,800 | 4,400 |  |  |
| None | — | 89 | 79 | 30 | Fail | — | 2,000 | 38 |
| UVA 1 | 1.0 | 84 | 84 | 79 | 72 | 50 | 2,400 | 36 |
| UVA 1 BTA | 1.0 1.0 | 84 | 84 | 80 | 82 | 78 | 4,000 | 4 |
| UVA 1 BTA | 1.0 0.05 | 86 | 76 | 78 | 84 | 83 | 4,400 | 4 |

[a]UVA 1 is 2-[2-hydroxy-3,5-di-(alpha,alpha-dimethylbenzyl)-phenyl]-2H—benzotriazole.
BTA is benzotriazole.

It is clear that the presence of the benzotriazole in the cured enamel not only prevented loss of gloss, but also essentially doubled the time required before any cracking of the film occured. This represents a tremendous and unexpected improvement in cured enamel properties.

What is claimed is:

1. A thermosetting, acid-curable enamel coating composition, stabilized against discoloration, degradation and light sensitivity resulting from contact with a copper or copper alloy substrate, which comprises
    (a) an acid-curable thermosetting resin which is selected from the group of thermosetting resins consisting of melamine-acrylic resins, melamine-polyester resins, and melamine-alkyd resins;
    (b) an acidic catalyst, suitable for curing said thermosetting resin, which is an aryl sulfonic acid;
    (c) an ultraviolet light-absorber which is a 2-(2-hydroxyphenyl)-2H-benzotriazole; and
    (d) a triazole which is benzotriazole or tolutriazole.

2. A composition according to claim 1 wherein said acid catalyst of component (b) is p-toluenesulfonic acid.

3. A composition according to claim 1 wherein said triazole of component (d) is present in a concentration in the range of 0.001 to 0.1% by weight of resin solids in the enamel composition.

4. A method for reducing the discoloration and degradation of acid-curable thermosetting enamels caused by contact of said enamels with copper or copper alloys, which comprises
    adding and admixing to said enamel an effective amount of benzotriazole or tolutriazole to reduce the copper content of said enamel.

* * * * *